United States Patent [19]

Takikawa et al.

[11] Patent Number: 4,724,498
[45] Date of Patent: Feb. 9, 1988

[54] DISK EJECTION MECHANISM FOR RECORDING-REPRODUCING DEVICE

[75] Inventors: Makito Takikawa; Motohiro Shimaoka, both of Furukawa, Japan

[73] Assignee: Alps Electric Co., Ltd., Japan

[21] Appl. No.: 836,958

[22] Filed: Mar. 6, 1986

[30] Foreign Application Priority Data

Mar. 6, 1985 [JP] Japan .................................. 60-44125

[51] Int. Cl.⁴ ...................... G11B 5/012; G11B 5/016
[52] U.S. Cl. ........................................ 360/97; 360/99; 360/262
[58] Field of Search ..................... 360/86, 97, 99, 133, 360/135, 96.5; 369/262, 261

[56] References Cited

U.S. PATENT DOCUMENTS 3,890,643  6/1975  Dalziel ................................. 360/99
4,194,224  3/1980  Grapes et al. ........................ 360/97
4,415,940  11/1983  Becker ................................ 360/99
4,586,097  4/1986  Koike et al. ......................... 360/99

FOREIGN PATENT DOCUMENTS 58-143463  8/1983  Japan .................................. 360/99
58-150165  9/1983  Japan .................................. 360/135
58-182163  10/1983  Japan .................................. 360/97
2160350  12/1985  United Kingdom .................. 360/99

Primary Examiner—Stuart N. Hecker
Assistant Examiner—Benjamin E. Urcia
Attorney, Agent, or Firm—Guy W. Shoup

[57] ABSTRACT

A disk recording-reproducing device including a clamp mechanism and eject mechanism for a disk, which is characterized by an eject board abutable on an insertion front end of the disk and urged toward an insertion opening for the disk, a lock mechanism for locking the eject board when the disk is inserted up to a drive position, a lock-release member for releasing the locked state of the eject board, and a cam member rotatable as it is rubbed by the lock-release member at the time of insertion of the disk. Either the cam member or the lock-release member is movable in cooperation with the eject board to shift in the direction of insertion and ejection of the disk, and the other is movable in cooperation with the clamp mechanism to shift substantially perpendicularly to the revolution plane of the cam member, whereby a comparatively large dimensional clearance is allowed for the cam member and lock-release member.

2 Claims, 10 Drawing Figures

DISK EJECTION MECHANISM FOR RECORDING-REPRODUCING DEVICE

BACKGROUND OF THE INVENTION

1. Field of the Invention

This invention relates to a disk recording-reproducing device for recording information magnetically on a recording surface of a flexible disk encased in a jacket and reproducing the same and, more particularly, to an eject mechanism for effecting insertion and ejection of the disk.

2. Description of the Prior Art

In conventional disk recording-reproducing devices, two types of ejection mechanisms are known in connection with the function of taking out a disk loaded in a drive position: one using independent mechanisms for effecting release action of a clamp mechanism for holding the disk and ejection of the disk and the other performing synchronously the release action and eject action of the clamped disk.

In the foregoing conventional systems, however, the first type of mechanism for effecting independently the release action and eject action against the clamped disk needs a complicated process of control because two steps are involved to eject the disk. The other type of effecting synchronously the release action and eject action against the clamped disk needs a complicated mechanism. Further, in order to ensure a proper timing relation between the lock and lock-release action of an eject mechanism and the action of a clamp mechanism it is required, because of the presence of accumulated variations of dimensional tolerance of respective parts, to adjust the eject mechanism actual insert, after assembly of a recording-reproducing device body.

SUMMARY OF THE INVENTION

It is a general object of the present invention to provide a disk recording-reproducing device which performs concurrently the release action and eject action by the use of a simple mechanism and whose eject action is not influenced by the variation of tolerance of respective parts, thereby eliminating troublesome adjustment of an eject mechanism after assembly of the device body.

To achieve the foregoing object the present invention provides a disk recording-reproducing device including a clamp mechanism and eject mechanism for a disk (3) encased in a jacket, characterized by an eject board (15) abutable on an insertion front end of the jacket of disk (3) and urged toward an insertion opening for the disk (3), a lock mechanism (13b,20) for locking the eject board (15) when the disk (3) is inserted up to a drive position, a lock-release member (19) for releasing the locked state of the eject board, and a cam member (16) rotatable as it is rubbed by the lock-release member (19) at the time of insertion of the disk (3), wherein one of the cam member (16) and lock-release member (19) is movable in cooperation with the eject board (15) to shift in the direction of insertion and ejection of the disk (3), and the other is movable in cooperation with the clamp mechanism to shift substantially perpendicularly to the revolution phase of the cam member (16).

DESCRIPTION OF THE PREFERRED EMBODIMENTS

Figure 1:
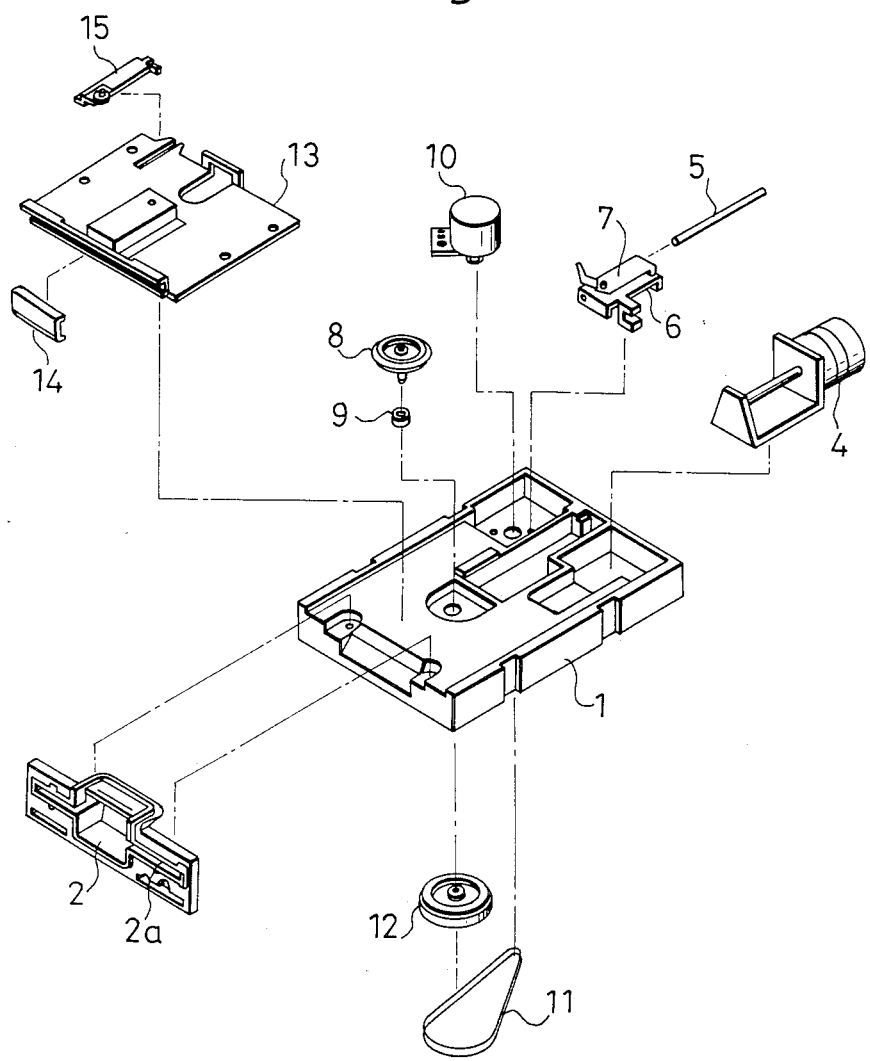
FIG. 1 is an exploded perspective view of the first embodiment of a disk recording-reproducing device according to the present invention.
Figure 2:
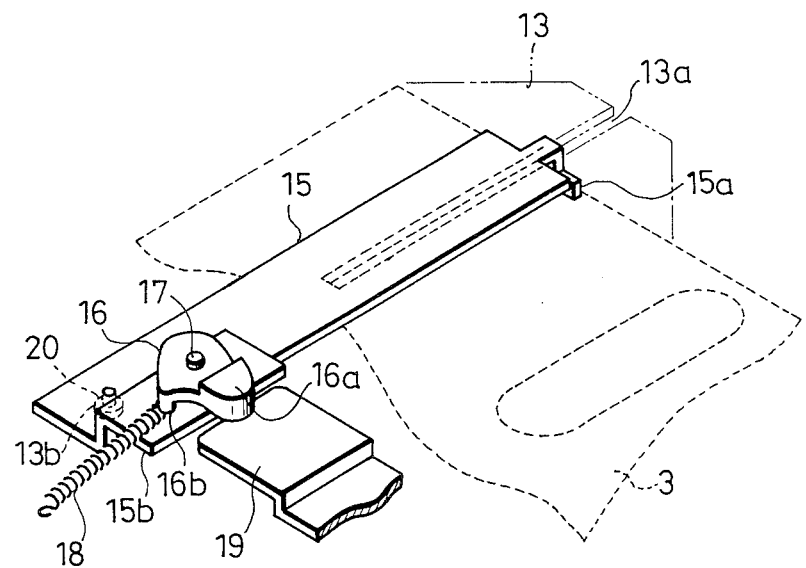
FIG. 2 is a perspective view of the first embodiment of an eject mechanism according to the present invention.
Figure 3A:
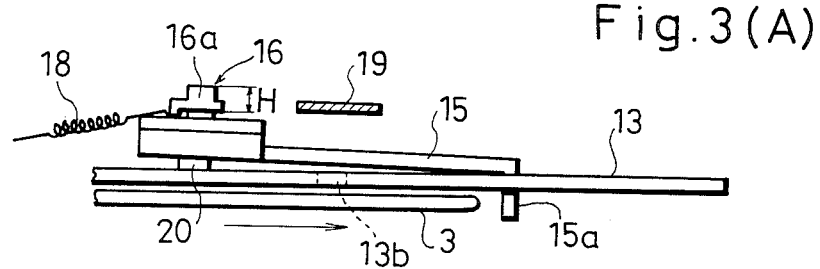
FIGS. 3(A) through 3(D) are side views for explanation of the eject action of the first embodiment.
Figure 3B:
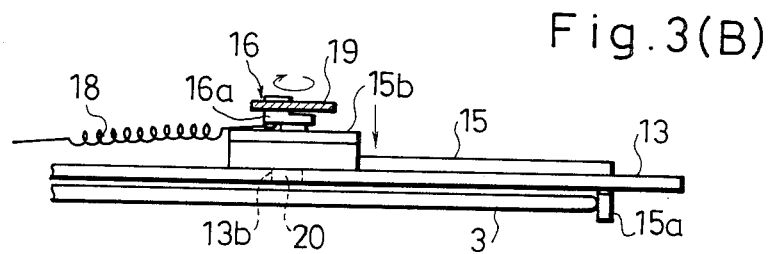
Figure 3C:
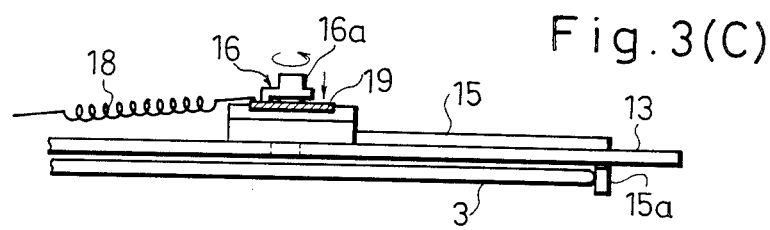
Figure 3D:
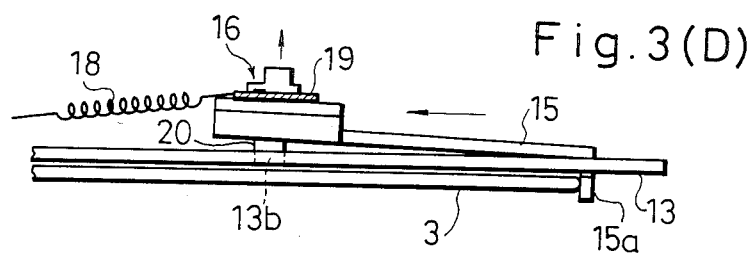

The present invention will now be described in detail with reference to its embodiments shown in the drawings, in which FIG. 1 is the exploded perspective view showing the first embodiment of a disk recording-reproducing device according to the present invention and FIG. 2 is the perspective view of the important portion of an eject mechanism of the first embodiment.

In these drawings, reference numeral 1 indicates a housing formed by aluminum-die casting, for example, and 2 indicates a front panel made of synthetic resin, secured in front of the housing 1, and formed with a narrow disk insertion opening 2a through which a disk 3 is loaded inside the device. 4 is a stepping motor mounted on the rear-end right-hand side of the housing 1, 5 is a guide shaft secured to the housing 1, and 6 is a carriage mounting thereon a magnetic head (not shown) which performs read/write of information with respect to the disk 3. The carriage 6 is positioned in a center portion on the rear side of the housing 1 and shifted reciprocatingly in the radial direction of the disk 3 along the guide shaft 5. On an upper portion of the carriage 6 one end of an arm 7 is supported swingably which is urged toward the carriage 6 by a spring. 8 is a spindle for receiving the disk 3 which is mounted rotatably on the housing 1 by means of a bearing 9. 10 is a drive motor for turning the disk 3 at a high speed, whose turning force is transmitted via a drive belt 11 and pulley 12 to the spindle 8. 13 is a lever frame provided with a clamp mechanism (not shown) including a hub engagable with the spindle 8 to pinch the disk 3, to which a door 14 and eject board 15 for effecting clamp action are attached.

As shown in the enlarged view of FIG. 2, the rearend center portion of the eject board 15 extends downward and the point of this extended center portion stretches laterally thereby forming an engage portion 15a. This engage portion 15a is caught in a narrow groove 13a formed in the lever frame 13 so that the eject board 15 can shift horizontally smoothly along the groove 13a. A portion on one side of the front end of the eject board 15 projects upward steppedly thereby forming a shelf portion 15b on which a cam 16 is supported rotatably about a shaft 17. A working portion 16a at the end of the cam 16 is made thicker than the other portion, and a spring hang portion 16b projecting downward of the cam holds a spring 18 for control of rotation of the cam 16, this spring 18 also functioning so as to urge the eject board 15 toward the disk insertion opening 2a. 19 is a clamp arm (lock-release member) linked to the clamp mechanism which when the disk 3 is inserted abuts on the side face of the working portion 16a of the cam 16 so that the cam 16 turns in the clockwise direction. In this connection, a lock pin 20 is secured on the under side of a front end portion of the eject board 15. Thus, as this lock pin 20 fits in a lock hole 13b formed in the lever frame 13, the eject board 15 is locked and can not move back toward the disk insertion opening 2a.

The operation of the thus configured eject mechanism will now be described. FIG. 3 is the side view for explanation of the insert/eject action of the present invention. As the disk 3 is inserted inside the recording-reproducing device, the front end of the jacket of disk 3 abuts on the engage portion 15a of the eject board 15 and the eject board 15 is pushed rearward in opposition to the strength of the spring 18 (see FIG. 3(A)). As the disk 3 is pushed further thereby to shift the eject board 15, the side face of the working portion 16a of the cam 16 supported on the shelf portion 15b of the eject board 15 abuts on the clamp arm 19 linked to the clamp mechanism and the cam 16 is turned in the clockwise direction when viewed from above. In this operation, because the thickness H of the working portion 16a is designed sufficiently large, some positional errors in the vertical direction of the cam 16 and clamp arm 19 do not influence the abutment between the cam 16 and the clamp arm 19. Then, as the eject board 15 comes up to the drive position of the disk 3, the lock pin 20 secured on the under face of the eject board 15 fits in the lock hole 13b formed in the lever frame 13, whereby the eject board 15 is locked (see FIG. 3(B)). Then, as the clamp manipulation for the disk 3 is commenced, the clamp arm 19 linked to the clamp mechanism moves down, and the cam 16 disengages from the clamp arm 19 and returns to the state prior to engagement with the clamp arm 19 due to the elastic strength of the spring 18. As a result, the working portion 16a of cam 16 and the clamp arm 19 lie partially one upon another vertically, but are spaced mutually a little (see FIG. 3(C)). At the time of the eject manipulation, as the clamp-release manipulation is commenced for the disk 3, the clamp arm 19 moves up, a portion on the upper face of the clamp arm 19 abuts on a portion on the lower face of the cam 16, and the cam 16 and the eject board 15 supporting the former are lifted. As a result, the lock pin 20 disengages from the lock hole 13b to release the locked state, the eject board 15 is pulled by means of the elastic strength of the spring 18, and the disk 3 is pushed by the engage portion 15a of the eject board 15, whereby the disk 3 is ejected outside the device (see FIG. 3(D)).

Summarizing the operation of the first embodiment, by insertion of the disk 3 the eject board 15 is pushed in opposition to the strength of the spring 18. As the disk 3 is pushed further, the cam 16 mounted on the eject board 15 abuts on the lock-release member (clamp arm) 19 and turns in the clockwise direction when viewed from above. Then, the lock pin 20 provided on the eject board 15 fits in the lock hole 13b, so that the eject board 15 is locked. Then, as clamping of the disk 3 is commenced, the lock-release member 19 linked to the clamp mechanism moves down and disengages from the cam 16, the cam 16 returns to the state prior to engagement with the lock-release member 19 due to the strength of the spring 18, and a portion of the cam 16 positions above the lock-release member 19. In the eject operation, as clamping of the disk 3 is released, the lock-release member 19 linked to the clamp mechanism moves up and the upper face of the lock-release member 19 abuts on the lower face of the cam 16; thus, the cam 16 is lifted. Then, because the lock pin 20 disengages from the lock hole 13b, the eject board 15 is pulled by the spring 18 and the disk 3 abutting on the eject board 15 is ejected outward.

The second embodiment of the present invention will now be described. The configuration of the recording-reproducing device of the second embodiment is identical to that of the first embodiment, except for the eject mechanism; thus no further detailed description is given therefor.

Figure 4:
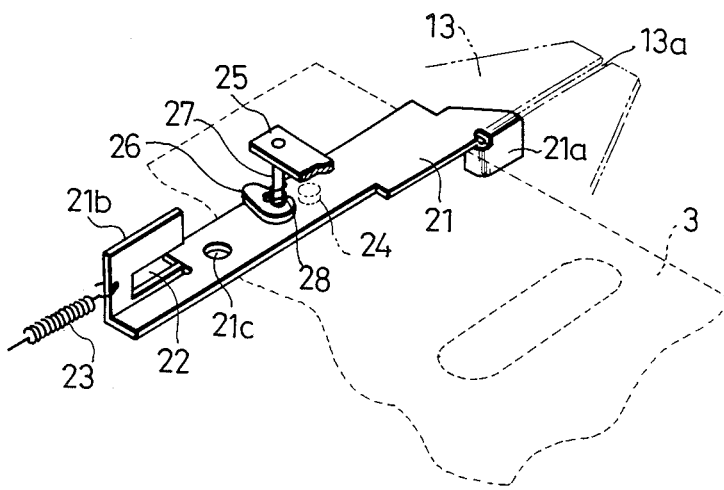
FIG. 4 is a perspective view of the second embodiment of the eject mechanism according to the present invention.

FIG. 4 is the perspective view of the important portion of the eject mechanism of the second embodiment. 21 indicates an eject board, and 21a indicates an engage portion of a flat and substantially L-shaped form which extends downward from the rear end of the eject board 21. The engage portion 21a is caught in the narrow groove 13a formed in the lever frame 13 so that the eject board 21 can shift horizontally smoothly along the groove 13a. 21b is a lock-release board of a substantially laid U-shaped form in side view, which is formed by cutting and bending a portion of a front end portion of the eject board 21 upward and has a horizontally-extending notch 22 in its center portion. A front end portion of the lock-release board 21b is coupled to a spring 23 so that the eject board 21 is urged toward the disk insertion opening. 21c is a lock hole bored in the eject board 21 which, when a lock pin 24 secured on the upper face of the lever frame 13 fits therein, locks the eject board 21 and prevents the same from returning toward the disk insertion opening. 25 is a clamp plate linked to the clamp mechanism, and 26 is a cam supported rotatably by the clamp plate 25 via a shaft 27, so that as the jacket of inserted disk 3 abuts on the lock-release plate 21b the cam 25 turns in the clockwise direction. 28 is a spring for urging the cam 26 so as to return the cam 26 having been turned by the lock-release plate 21b to the position shown in FIG. 4.

Figure 5A:
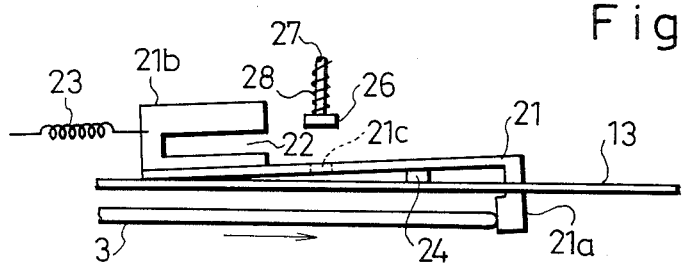
FIGS. 5(A) through 5(C) are side views for explanation of the eject action of the second embodiment.
Figure 5B:
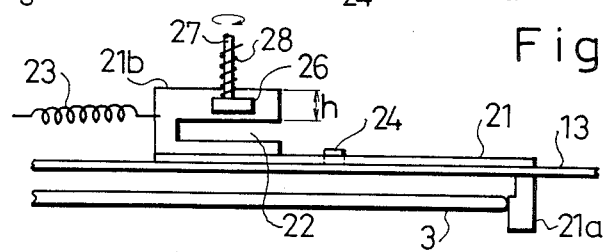
Figure 5C:
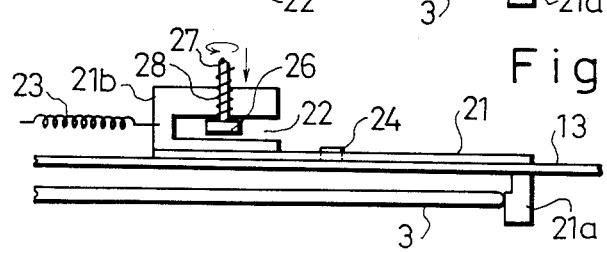

The operation of the thus configured eject mechanism will now be described. FIG. 5 is the side view for explanation of the insert/eject action of the second embodiment. As the disk 3 is inserted inside the recording-reproducing device, the front end of the jacket of disk 3 abuts on the engage portion 21a of the eject board 21 and the eject board 21 is pushed in opposition to the strength of the spring 23 ( see FIG. 5(A) ). As the disk 3 is pushed further to shift the eject board 21, the lock-release plate 21b provided on the front upper face of the eject board 21 abuts on the side face of the cam 26 linked to the clamp mechanism, and the cam 26 turns in the clockwise direction when viewed from above. In this connection, because the contactable width h of the lock-release plate 21b with the cam 26 is designed sufficiently large, some positional errors in the vertical direction of the lock-release plate 21b and cam 26 do not influence the abutment between the lock-release plate 21b and the cam 26. Then, as the eject board 21 comes up to the drive position of the disk 3, the lock pin 24 secured on the upper face of the lever frame 13 fits in the lock hole 21c formed in the eject board 21, whereby the eject board 21 is locked (see FIG. 5(B)). Then, as the clamp manipulation is commenced against the disk 3, the cam 26 linked to the clamp mechanism moves down and, as the cam 26 comes up to the notch 22, it disengages from the lock-release plate 21b and returns to the state prior to engagement with the lock-release plate 21b due to the elastic strength of the spring 28. As a result, the cam 26 is positioned inside the notch 22 without contact with the lock-release plate 21b (see FIG. 5(C)). In the eject manipulation, although not shown, as the clamp-release manipulation is commenced against the disk 3, the cam 26 moves up, and the upper face of the cam 26 abuts on the lock-release plate 21b in the inside of the notch 22, whereby the eject board 21 formed integrally with the lock-release plate 21b is lifted. In response to the above, the lock pin 24 disengages from the lock hole 21c to release the locked state, and the eject board 21 is pulled by means of the elastic strength of the spring 23, whereby the disk 3 is pushed by the engage portion 21a of the eject board 21 and ejected outside the device.

As is apparent from the foregoing configuration, the present invention produces the effects that the eject mechanism synchronized with the clamp manipulation can be realized in a simplified configuration by the use of a reduced number of parts, and no fine adjustment of ejection is required after assembly of the device body because dimensional clearance is provided taking into account the realative movements for the mutually contactable cam member and lock-release member.

What is claimed is:

1. A disk ejecting mechanism for a recording-reproducing device provided with a housing having a disk insertion slot formed in a front part thereof for insertion of a disk horizontally along an insertion path to a drive position within the housing, a clamping mechanism movable vertically in one direction to clamp the disk on a turntable in said housing at the drive position and in the other vertical direction to unclamp the disk, said ejecting mechanism being provided for ejecting the disk from the drive position to an eject position outwardly through the insertion slot, comprising:

an eject board movable within said housing horizontally along said insertion path and biased by a biasing force toward the eject position, said eject board having an engage portion extending into said insertion path which is abutable by a leading edge of a jacket of the disk inserted through said insertion slot such that said eject board is moved against the biasing force in conjunction with insertion of the disk to the drive position;

a lock mechanism in said housing for locking said eject board when the disk is inserted up to the drive position, whereupon the disk is clamped on the turntable by movement of the clamping mechanism in the one vertical direction;

a lock release member supported on and movable vertically with said clamping mechanism for releasing said eject board from said locking mechanism so that said eject board can be moved by the biasing force to bring the disk to the eject position;

a rotatable cam member supported on and movable horizontally with said eject board having an eccentric shape rotatable in a horizontal plane in one direction when a peripheral surface thereof is rubbed in contact against said lock release member as said cam member is being moved horizontally with said eject board to the drive position, said cam member being released from rubbing contact with said lock release member when said lock release member is moved vertically with said clamping mechanism in the one vertical direction and being biased to rotate in a reverse direction such that another surface of said cam member can subsequently be engaged by said lock release member to release the eject board when said lock release member is moved vertically with the clamping mechanism in the other vertical direction.

2. A disk ejecting mechanism for a recording-reproducing device provided with a housing having a disk insertion slot formed in a front part thereof for insertion of a disk horizontally along an insertion path to a drive position within the housing, a clamping mechanism movable vertically in one direction to clamp the disk on a turntable in said housing at the drive position and in the other vertical direction to unclamp the disk, said ejecting mechanism being provided for ejecting the disk from the drive position to an eject position outwardly through the insertion slot, comprising:

an eject board movable within said housing horizontally along said insertion path and biased by a biasing force toward the eject position, said eject board having an engage portion extending into said insertion path which is abutable by a leading edge of a jacket of the disk inserted through said insertion slot such that said eject board is moved against the biasing force in conjunction with insertion of the disk to the drive position;

a lock mechanism in said housing for locking said eject board when the disk is inserted up to the drive position, whereupon the disk is clamped on the turntable by movement of the clamping mechanism in the one vertical direction;

a lock release member supported on and movable horizontally with said eject board for releasing said eject board from said locking mechanism so that said eject board can be moved by the biasing force to bring the disk to the eject position;

a rotatable cam member supported on and movable vertically with said clamping mechanism having an eccentric shape rotatable in a horizontal plane in one direction when a peripheral surface thereof is rubbed in contact by said lock release member as said lock release member is being moved horizontally with said eject board to the drive position, said cam member being released from rubbing contact with said lock release member when said cam member is moved vertically with said clamping mechanism in the one vertical direction and being biased to rotate in a reverse direction such that another surface of said cam member can subsequently engage said lock release member to release the eject board when said cam member is moved vertically with the clamping mechanism in the other vertical direction.

* * * * *